United States Patent
Wu

(10) Patent No.: US 10,091,790 B2
(45) Date of Patent: Oct. 2, 2018

(54) METHOD AND APPARATUS FOR PERFORMING DIRECT COMMUNICATIONS IN WIRELESS COMMUNICATION SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/687,883

(22) Filed: Apr. 15, 2015

(65) Prior Publication Data

US 2015/0223226 A1 Aug. 6, 2015

Related U.S. Application Data

(62) Division of application No. 13/792,216, filed on Mar. 11, 2013, now Pat. No. 9,226,298.

(Continued)

(51) Int. Cl.
*H04W 72/04* (2009.01)
*H04W 72/02* (2009.01)
(Continued)

(52) U.S. Cl.
CPC ......... *H04W 72/048* (2013.01); *H04W 72/02* (2013.01); *H04W 72/04* (2013.01); *H04W 72/042* (2013.01); *H04W 76/14* (2018.02); *H04L 63/205* (2013.01); *H04W 8/005* (2013.01); *H04W 72/0493* (2013.01)

(58) Field of Classification Search
CPC ... H04W 76/023; H04W 12/00; H04W 12/08; H04W 72/0493; H04W 72/0406; H04W 72/0402; H04W 72/04; H04W 8/005; H04W 12/04; H04W 12/06; H04L 63/205; H04L 29/02
See application file for complete search history.

(56) References Cited

U.S. PATENT DOCUMENTS

| | | |
|---|---|---|
| 8,588,156 B1 | 11/2013 | Liu |
| 8,588,690 B2 | 11/2013 | Turtinen |

(Continued)

FOREIGN PATENT DOCUMENTS

| | | |
|---|---|---|
| CN | 101772199 A | 7/2010 |
| CN | 102265699 A | 11/2011 |

(Continued)

OTHER PUBLICATIONS

European patent application No. 13158590.3, European Search Report dated Jul. 31, 2013.

(Continued)

*Primary Examiner* — Warner Wong
(74) *Attorney, Agent, or Firm* — Winston Hsu

(57) ABSTRACT

A method of assigning resources to perform direct communications in a network of a wireless communication system includes generating and sending a first resource allocation configuration allocating resources for transmitting a transport block in a subframe to a first communication device; and generating and sending a second resource allocation configuration allocating resources for receiving the transport block in the subframe to a second communication device; wherein the resources for transmitting the transport block are identical to the resources for receiving the transport block.

10 Claims, 8 Drawing Sheets

Related U.S. Application Data

(60) Provisional application No. 61/609,377, filed on Mar. 12, 2012.

(51) Int. Cl.
*H04W 76/14* (2018.01)
*H04W 8/00* (2009.01)
*H04L 29/06* (2006.01)

(56) References Cited

U.S. PATENT DOCUMENTS

| | | | |
|---|---|---|---|
| 9,036,517 B2* | 5/2015 | Bijwe | H04W 76/022 370/310 |
| 9,319,955 B2* | 4/2016 | Kim | H04W 36/22 |
| 9,320,067 B2* | 4/2016 | Ho | H04B 7/022 |
| 9,538,566 B2* | 1/2017 | Choi | H04L 1/16 |
| 2005/0111383 A1* | 5/2005 | Grob | H04W 52/06 370/254 |
| 2006/0153105 A1 | 7/2006 | Jia | |
| 2006/0178148 A1 | 8/2006 | Du | |
| 2006/0229092 A1 | 10/2006 | Jia | |
| 2006/0258382 A1 | 11/2006 | Zhang | |
| 2009/0023460 A1 | 1/2009 | Cho | |
| 2010/0009675 A1* | 1/2010 | Wijting | H04W 72/02 455/426.1 |
| 2010/0093364 A1 | 4/2010 | Ribeiro | |
| 2010/0136997 A1 | 6/2010 | Palanki | |
| 2010/0165882 A1 | 7/2010 | Palanki | |
| 2011/0098043 A1 | 4/2011 | Yu | |
| 2011/0134827 A1 | 6/2011 | Hooli | |
| 2011/0282989 A1 | 11/2011 | Geirhofer | |
| 2012/0020213 A1 | 1/2012 | Horneman | |
| 2013/0109301 A1 | 5/2013 | Hakola | |
| 2013/0223318 A1 | 8/2013 | Liu | |
| 2013/0223352 A1 | 8/2013 | Sartori | |
| 2013/0223353 A1 | 8/2013 | Liu | |
| 2013/0223398 A1 | 8/2013 | Li | |
| 2013/0229957 A1 | 9/2013 | Sartori | |
| 2014/0010209 A1 | 1/2014 | Hakola | |
| 2014/0185529 A1 | 7/2014 | Lim | |
| 2014/0286293 A1 | 9/2014 | Jang | |
| 2015/0023267 A1* | 1/2015 | Lim | H04L 1/1854 370/329 |
| 2017/0303294 A1* | 10/2017 | Liu | H04W 72/121 |

FOREIGN PATENT DOCUMENTS

| | | |
|---|---|---|
| CN | 102282901 A | 12/2011 |
| EP | 2 124 498 A2 | 11/2009 |
| WO | 2011036507 A1 | 3/2011 |
| WO | 2011085810 A1 | 7/2011 |

OTHER PUBLICATIONS

European patent application No. 13158590.3, European application filing date Mar. 11, 2013, European Search Report dated Sep. 3, 2013.

Office action dated Nov. 12, 2014 for the Taiwan application No. 102108657, filing date Mar. 12, 2013, p. 1-10.

European patent application No. 14168018.1, European application filing date Mar. 11, 2013, European Search Report dated Sep. 9, 2014.

Office action dated Jan. 22, 2015 for the U.S. Appl. No. 13/792,216, filed Mar. 11, 2013, p. 1-20.

Office action dated May 27, 2015 for the China application No. 201310078583.5, filing date Mar. 12, 2013, p. 1-9.

Notice of Allowance dated Sep. 3, 2015 for the U.S. Appl. No. 13/792,216, filed Mar. 11, 2013, p. 1-10.

Office action dated Jan. 31, 2018 for the China application No. 201510665142.4, filing date Mar. 12, 2013, p. 1-6.

* cited by examiner

METHOD AND APPARATUS FOR PERFORMING DIRECT COMMUNICATIONS IN WIRELESS COMMUNICATION SYSTEM

CROSS REFERENCE TO RELATED APPLICATIONS

This is a divisional application of U.S. application Ser. No. 13/792,216, filed on Mar. 11, 2013, which claims the benefit of U.S. Provisional Application No. 61/609,377, filed on Mar. 12, 2012, entitled "Method and Apparatus for LTE UE to UE communication in a wireless communication system".

BACKGROUND OF THE INVENTION

1. Field of the Invention

The application relates to a method and apparatus utilized in a wireless communication system, and more particularly, to a method and apparatus of performing direct communications in a wireless communication system.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Please refer to FIG. 1, which is a schematic diagram of a wireless communication system 10 according to the prior art. The wireless communication system includes a network 100 and two communication devices 102 and 104. The network can be an E-UTRAN and the communication devices 102 and 104 can be UEs. In detail, when the communication device 102 needs to transmit data to the communication device 104, the communication device 102 sends data via the network 100 and the communication device 104 receives data via the network 100. In other words, the network 100 receives data from the communication device 102 and transmits data to the communication device 104. This is similar forwarding. This forwarding is unnecessary and wastes overhead due to the reception and transmission. If the communication device 102 can directly transmit data to the communication device 104, the overhead can be saved by avoiding this forwarding. However, how to realize direct communications between two communication devices is not defined in the prior art.

SUMMARY OF THE INVENTION

The present invention therefore provides a method and apparatus for performing direct communications in a wireless communication system, to reduce energy of the reception and transmission.

A method of assigning resources to perform direct communications in a network of a wireless communication system is disclosed. The method comprises generating and sending a first resource allocation configuration allocating resources for transmitting a transport block in a subframe to a first communication device; and generating and sending a second resource allocation configuration allocating resources for receiving the transport block in the subframe to a second communication device; wherein the resources for transmitting the transport block are identical to the resources for receiving the transport block.

A method of assigning resources to perform direct communications in a first communication device of a wireless communication system is disclosed. The method comprises obtaining a first resource allocation configuration allocating resources for transmitting a transport block in a subframe to a second communication device, from a network; generating a second resource allocation configuration allocating resources for the second communication device to receive the transport block in the subframe; and sending the second resource allocation configuration to the second communication device.

A method of assigning resources to perform direct communications in a first communication device of a wireless communication system is disclosed. The method comprises receiving a first resource allocation configuration transmitted by a second communication device wherein the first resource allocation allocates resources for the first communication device to receive a transport block transmitted by the second communication device in a subframe; and receiving the transport block according to the first resource allocation configuration; wherein the first resource allocation configuration is generated by the second communication device and the transport block is transmitted by the second communication device according to the second resource allocation configuration which allocates resources for the second communication device to transmit the transport block in the subframe to the first communication device.

A method of assigning resources to perform direct communications in a network of a wireless communication system for a network is disclosed. The method comprises transmitting a first resource allocation configuration allocating resources for a first communication device to transmit a transport block in a subframe to a second communication device; wherein the first communication device generates a second resource allocation configuration allocating resources for the second communication device to receive the transport block in the subframe; and transmits the second resource allocation configuration to the second communication device.

A communication apparatus for assigning resources to perform direct communications in a network of a wireless communication system is disclosed. The communication apparatus comprises a processing means; and a storage unit, coupled to the processing means, for storing a program code, wherein the program code instructs the processing means to execute the following steps: generating and sending a first resource allocation configuration allocating resources for transmitting a transport block in a subframe to a first communication device; and generating and sending a second resource allocation configuration allocating resources for receiving the transport block in the subframe to a second communication device; wherein the resources for transmitting the transport block are identical to the resources for receiving the transport block.

A communication apparatus for assigning resources to perform direct communications in a first communication device of a wireless communication system is disclosed. The communication apparatus comprises a processing means; and a storage unit, coupled to the processing means, for storing a program code, wherein the program code instructs the processing means to execute the following steps: obtaining a first resource allocation configuration allocating resources for transmitting a transport block in a subframe to a second communication device, from a network; generating a second resource allocation configuration allocating resources for the second communication device to receive the transport block in the subframe; and sending the second resource allocation configuration to the second communication device.

A communication apparatus for assigning resources to perform direct communications in a first communication device of a wireless communication system is disclosed. The communication apparatus comprises a processing means; and a storage unit, coupled to the processing means, for storing a program code, wherein the program code instructs the processing means to execute the following steps: receiving a first resource allocation configuration transmitted by a second communication device wherein the first resource allocation allocates resources for the first communication device to receive a transport block transmitted by the second communication device in a subframe; and receiving the transport block according to the first resource allocation configuration; wherein the first resource allocation configuration is generated by the second communication device and the transport block is transmitted by the second communication device according to the second resource allocation configuration which allocates resources for the second communication device to transmit the transport block in the subframe to the first communication device.

A communication apparatus for assigning resources to perform direct communications in a network of a wireless communication system for a network is disclosed. The communication apparatus comprises a processing means; and a storage unit, coupled to the processing means, for storing a program code, wherein the program code instructs the processing means to execute the following steps: transmitting a first resource allocation configuration allocating resources for a first communication device to transmit a transport block in a subframe to a second communication device; wherein the first communication device generates a second resource allocation configuration allocating resources for the second communication device to receive the transport block in the subframe; and transmits the second resource allocation configuration to the second communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
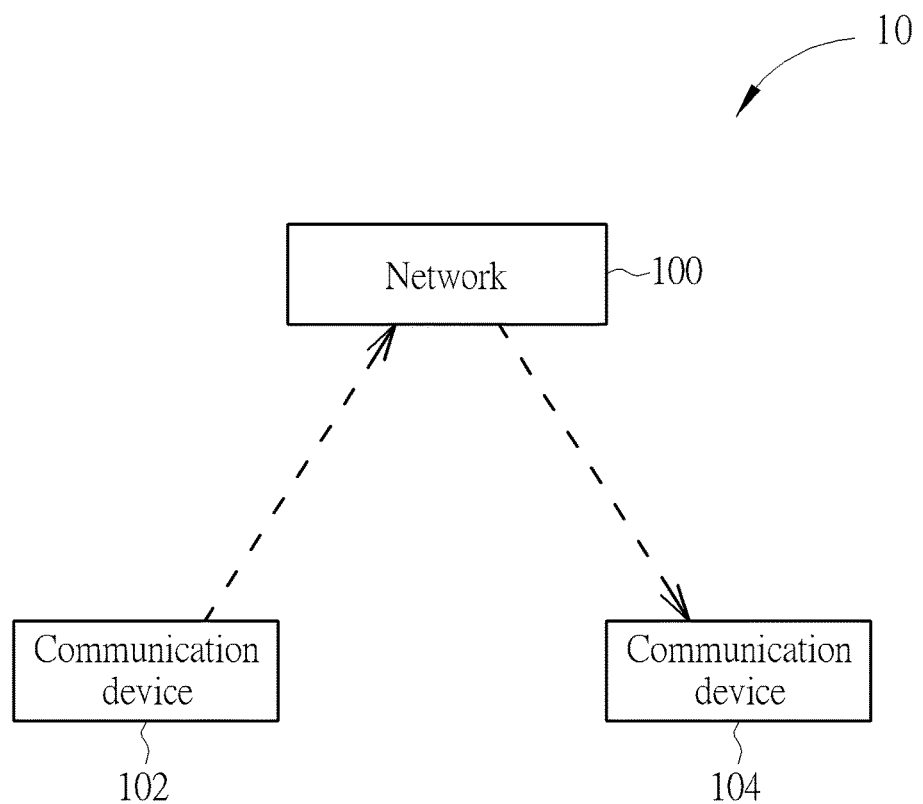
FIG. 1 is a schematic diagram of a wireless communication system according to an example of the prior art.
Figure 2:
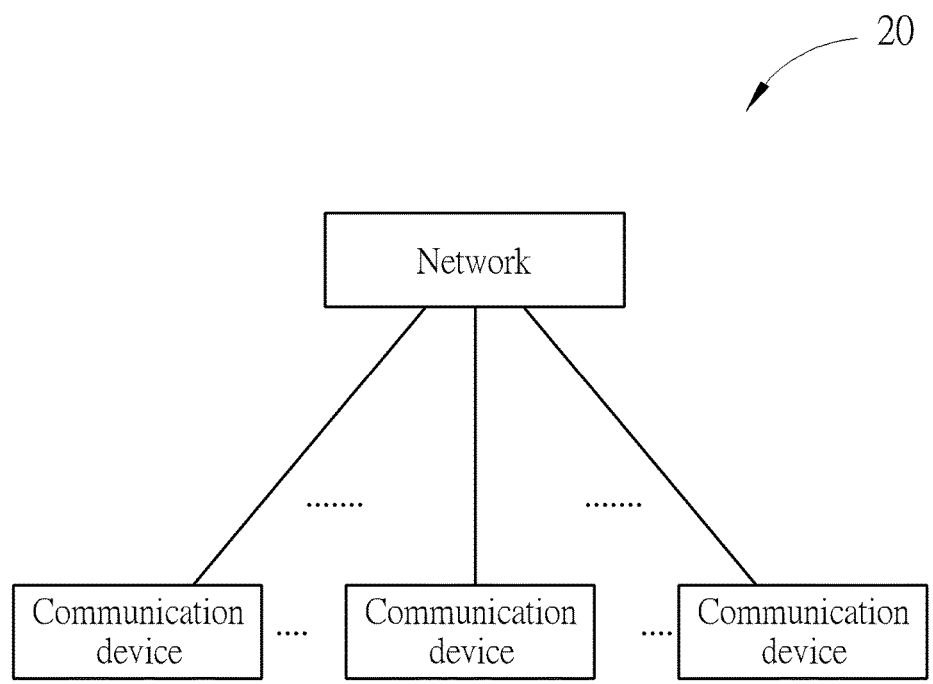
FIG. 2 is a schematic diagram of a wireless communication system according to an example of the present invention.

Please refer to FIG. 2, which is a schematic diagram of a wireless communication system 20 according to an example of the present invention. The wireless communication system 20 is briefly composed of a network and a plurality of communication devices. In FIG. 2, the network and the communication devices are simply utilized for illustrating the structure of the wireless communication system 20. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The communication devices can be mobile communication devices such as user equipments for performing speech and data communication through the network such as the UMTS, the LTE system or the LTE-A system. Besides, the network and one of the communication devices can be seen as a transmitter or a receiver according to transmission direction, e.g., for an uplink (UL), the communication device is the transmitter and the network is the receiver, and for a downlink (DL), the network is the transmitter and the communication device is the receiver.

Figure 3:
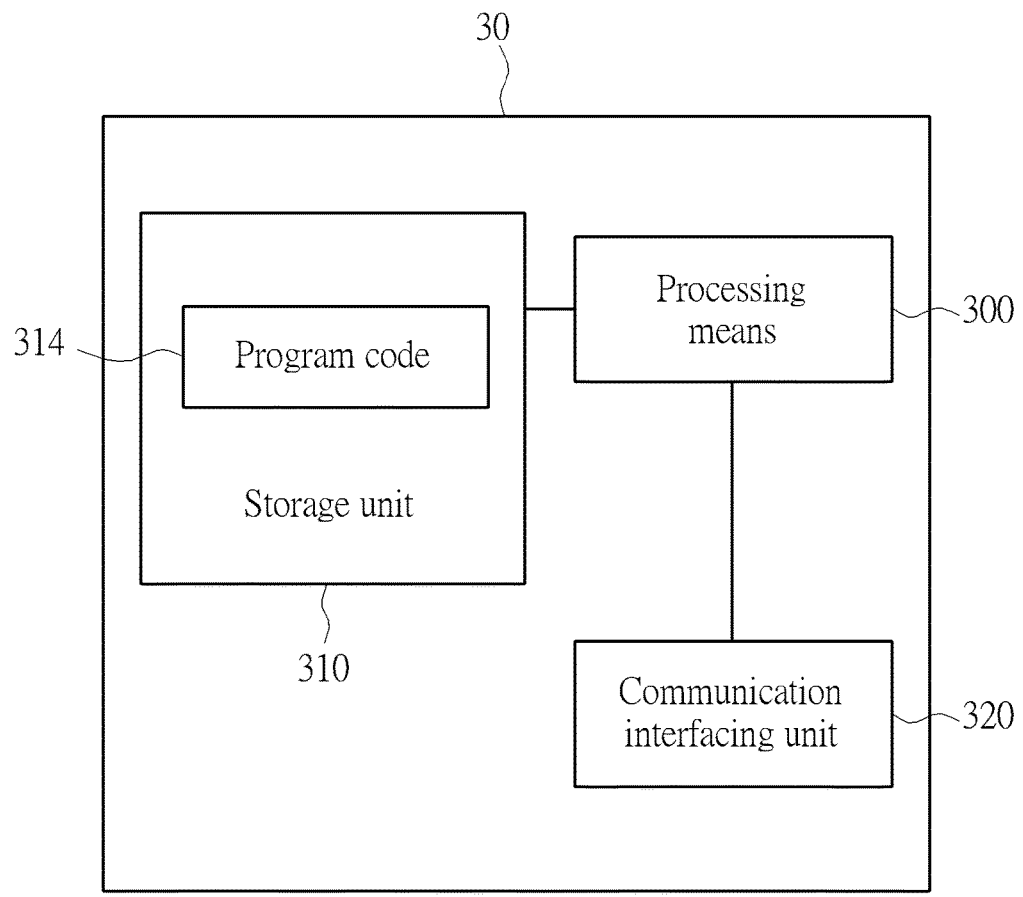
FIG. 3 is a schematic diagram of a communication apparatus according to an example of the present invention.

Please refer to FIG. 3, which is a schematic diagram of a communication apparatus 30 according to an example of the present invention. The communication apparatus 30 can be the network or one of the communication devices shown in FIG. 2, but is not limited herein. The communication apparatus 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
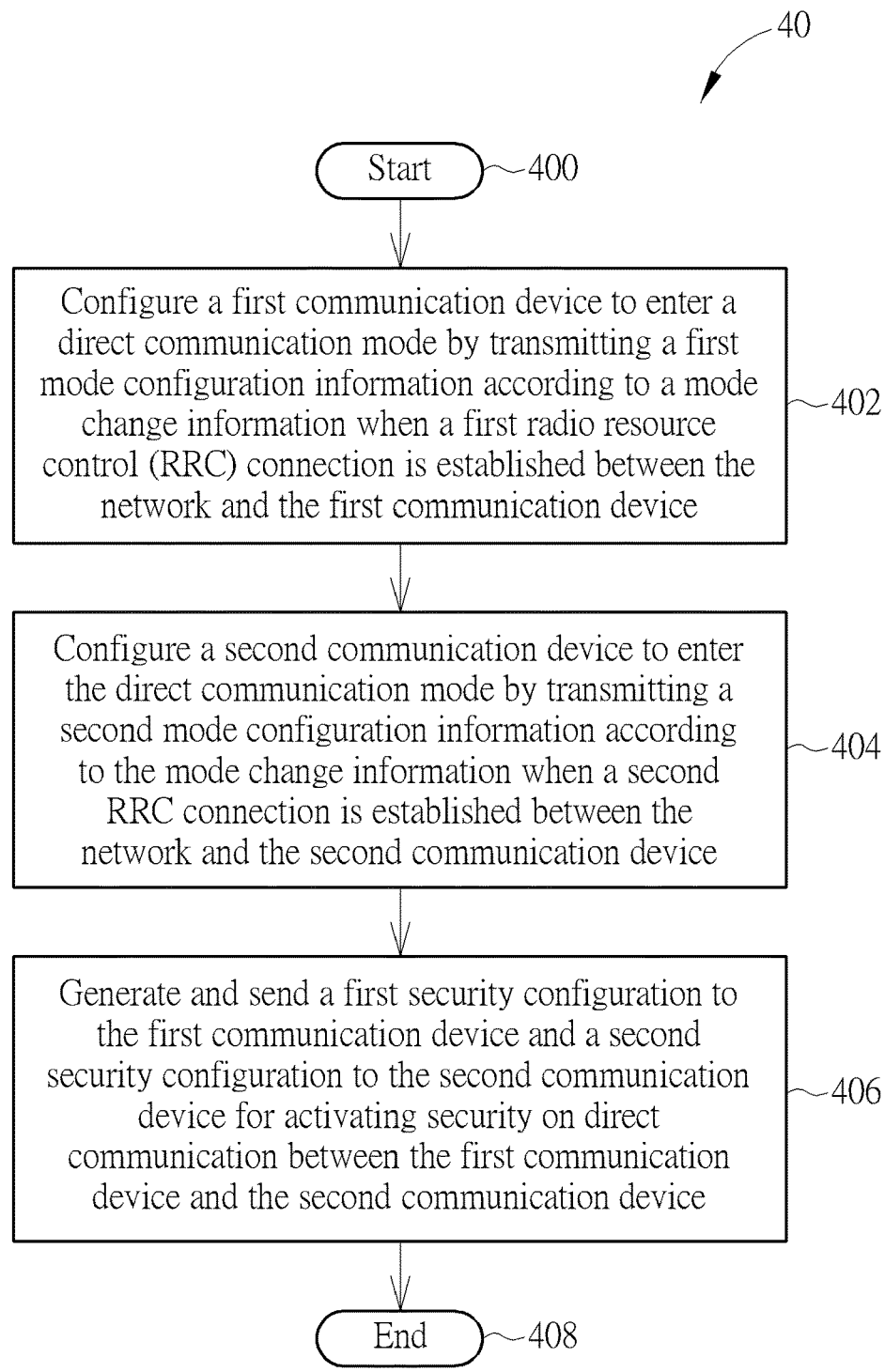
FIG. 4 is a flowchart of a process according to an example of the present invention.

Please refer to FIG. 4, which is a flowchart of a process 40 according to an example of the present invention. The process 40 is utilized in the wireless communication system 20 shown in FIG. 2, for performing direct communications in the network. The process 40 can be utilized in the network and may be compiled into the program code 314. The process 40 includes the following steps:

Step 400: Start.

Step 402: Configure a first communication device to enter a direct communication mode by transmitting a first mode configuration information according to a mode change information when a first radio resource control (RRC) connection is established between the network and the first communication device.

Step 404: Configure a second communication device to enter the direct communication mode by transmitting a second mode configuration information according to the mode change information when a second RRC connection is established between the network and the second communication device.

Step 406: Generate and send a first security configuration to the first communication device and a second security configuration to the second communication device for activating security on direct communication between the first communication device and the second communication device.

Step 408: End.

According to the process 40, the network respectively configures the first communication device and the second communication device to enter the direct communication mode according to the mode change information and send the first security configuration to the first and the second security configuration to the second communication devices when the first communication device and the second communication device respectively have the first RRC connection and the second RRC connection with the network. The first security configuration can be sent to the first communication device on the first RRC connection in a first RRC message and the second security configurations can be sent to the second communication device on the second RRC connection in a second RRC message. To securely send the first and second security configurations, the network sends the first RRC message after the first RRC connection has security configuration activated and the second RRC message after the second RRC connection has security configuration activated. Alternatively the first and second security configurations may be sent to the first and second communication devices in short messages or non-access stratum (NAS) messages. When the first communication device receives the first security configuration, the first communication device ciphers data or performs integrity protection on data directly transmitted to the second communication device using the first security configuration. The second communication device deciphers the ciphered data or checks integrity of the integrity protected data using the second security configuration. When the second communication device receives the second security configuration, the second communication device ciphers data or performs integrity protection on data directly transmitted to the first communication device using the second security configuration. The first communication device deciphers the ciphered data or checks integrity of the integrity protected data using the first security configuration. Therefore, the first and second communication devices can perform direct communications with each other securely by respectively using the first and second security configurations.

In detail, in Steps 402 and 404, the mode change information is used for determining if the first and second communication devices enter the direct communication mode. If the network determines the first and second communication devices enter the direct communication mode to directly communicate with each other, the network respectively transmits the first and second mode configuration information to the first and second communication devices. Besides, in Step 406, the first and second security configurations are further used for at least one of ciphering data, deciphering data, protecting data integrity and checking data integrity, so that transmissions between the first and second communication devices are secure.

Note that, the process 40 is an example of the present invention. Those skilled in the art should readily make combinations, modifications and/or alterations on the above-mentioned description and examples. For example, the mode change information may be a mode change request received from the first communication device or the second communication device, a discovery report indicating the second communication device received from the first communication device, or a request or notification received from an evolved packet core (EPC) or generated by the network itself. Moreover, the first mode configuration information is carried on a first physical downlink control channel (PDCCH), a first medium access control (MAC) control element or a first radio resource control (RRC) message between the first communication device and the network, and the second configuration information is carried on a second PDCCH, a second MAC control element or a second RRC message between the second communication device and the network. Besides, the security configuration may contain security parameters including at least one of at least one ciphering key, at least one parameter for deriving at least one ciphering key, at least one ciphering algorithm, at least one integrity key, at least one parameter for deriving at least one integrity key, at least one integrity protection algorithm. The first and second security configurations may have same or different security parameters. For example, the first and second security configurations may have a same ciphering key or a same parameter for deriving a ciphering key.

Besides, the at least one ciphering key may comprise only a ciphering key used for both ciphering data and deciphering data or comprise a first ciphering key for ciphering data and a second ciphering key for deciphering data. The at least one ciphering algorithm may comprise only a ciphering algorithm used for both ciphering data and deciphering data or comprise a first ciphering algorithm for ciphering data and a second algorithm for deciphering data. The at least one parameter for deriving at least one ciphering key may comprise only a parameter for deriving a ciphering key for both ciphering data and deciphering data or for deriving a first ciphering key for ciphering data and a second ciphering key for deciphering data, or comprise a first parameter for deriving a first ciphering key for ciphering data and a second parameter for deriving a second ciphering key for deciphering data. The at least one integrity key may comprise only a integrity key used for both data integrity protection and data integrity checking or comprise a first integrity key for data integrity protection and a second integrity key for data integrity checking. The at least one integrity protection algorithm may comprise only a integrity protection algorithm used for both data integrity protection and data integrity checking or comprise a first integrity protection algorithm for data integrity protection and a second integrity protection key for data integrity checking. The at least one parameter for deriving at least one integrity key may comprise only a parameter for deriving a integrity key for both data integrity protection and data integrity checking or for deriving a first integrity key for data integrity protection and a second integrity key for data integrity checking, or comprise a first parameter for deriving a first integrity key for data integrity protection and a second parameter for deriving a second integrity key for data integrity checking.

Moreover, to make the security more robust, the first security configuration should be different from the security configuration activated on the first RRC connection and the second security configuration should be different from the security configuration activated on the second RRC connection.

On the other hands, the first and second communication devices enter the direct communication mode after receiving the first and second mode configuration information from the network. The first and second communication devices apply the first and the second security configurations respectively. Moreover, one of the first and second communication devices may further transmit a detecting signal to the other one for the latter to detect the existence of the former. In other words, the first communication device may transmit a first signal for the second communication device to detect the existence of the first communication device after receiving the first mode configuration information. The second communication device follows to transmit a second signal for the first communication device to detect the existence of the second communication device after receiving the first signal. If the detection is not successful in the first or second communication device, a massage may be transmitted to the network to indicate such a failure. Besides, the first signal may be used for the first communication device to calculate a timing advance for the second communication device to perform an uplink transmission between the first and second communication devices. The usage of the second signal is similar to that of the first signal. Note that, the first and second signals can be physical layer signals, MAC control elements, radio link control (RLC) packet data units (PDUs), packet data convergence protocol (PDCP) PDUs or RRC messages. The format of the first and second signals or the symbols and the positions of the first and second signals may be predetermined by a third Generation Partnership Project (3GPP) specification or configured by the network.

Figure 5:
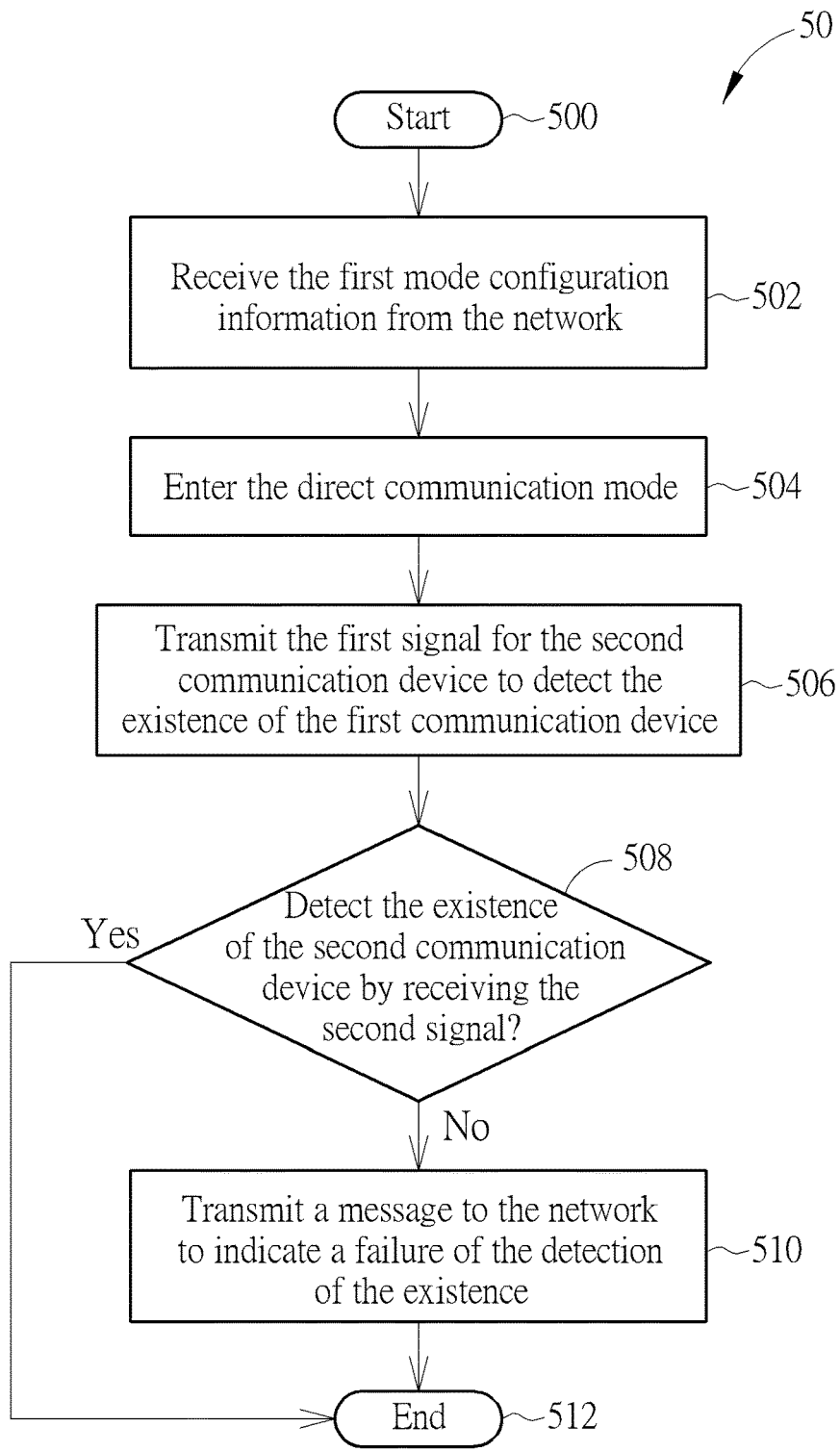
FIG. 5 is a flowchart of a process according to an example of the present invention.

As seen above, the operations of the first communication device for performing the direct communications can be summarized to a process 50 as shown in FIG. 5. The process 50 can be compiled into the program code 314 and includes the following steps:

Step 500: Start.

Step 502: Receive the first mode configuration information from the network.

Step 504: Enter the direct communication mode.

Step 506: Transmit the first signal for the second communication device to detect the existence of the first communication device.

Step 508: Detect the existence of the second communication device by receiving the second signal? If the second communication device exists, execute Step 512; if not, execute step 510.

Step 510: Transmit a message to the network to indicate a failure of the detection of the existence.

Step 512: End.

In brief, the first communication device enters the direct communication mode by receiving the first mode configuration information and detects the existence of the second communication device to make sure the direct communications can work normally. The first communication device may further receive a security configuration. The first communication device may transmit the first signal for the second communication device to detect the existence of the first communication device before or after detecting the existence of the second communication device. Therefore, the first communication device can perform the direct communications with the second communication device securely. Similarly the second communication device performs the detection of the first communication device as described above.

Besides, when the network receives the message indicating the failure of the detection of the existence, the network may send a message configuring the first communication device to leave the direct communication mode and may also send another message configuring the second communication device to leave the direct communication mode accordingly. The messages can be MAC control elements, RRC messages or NAS messages.

Figure 6:
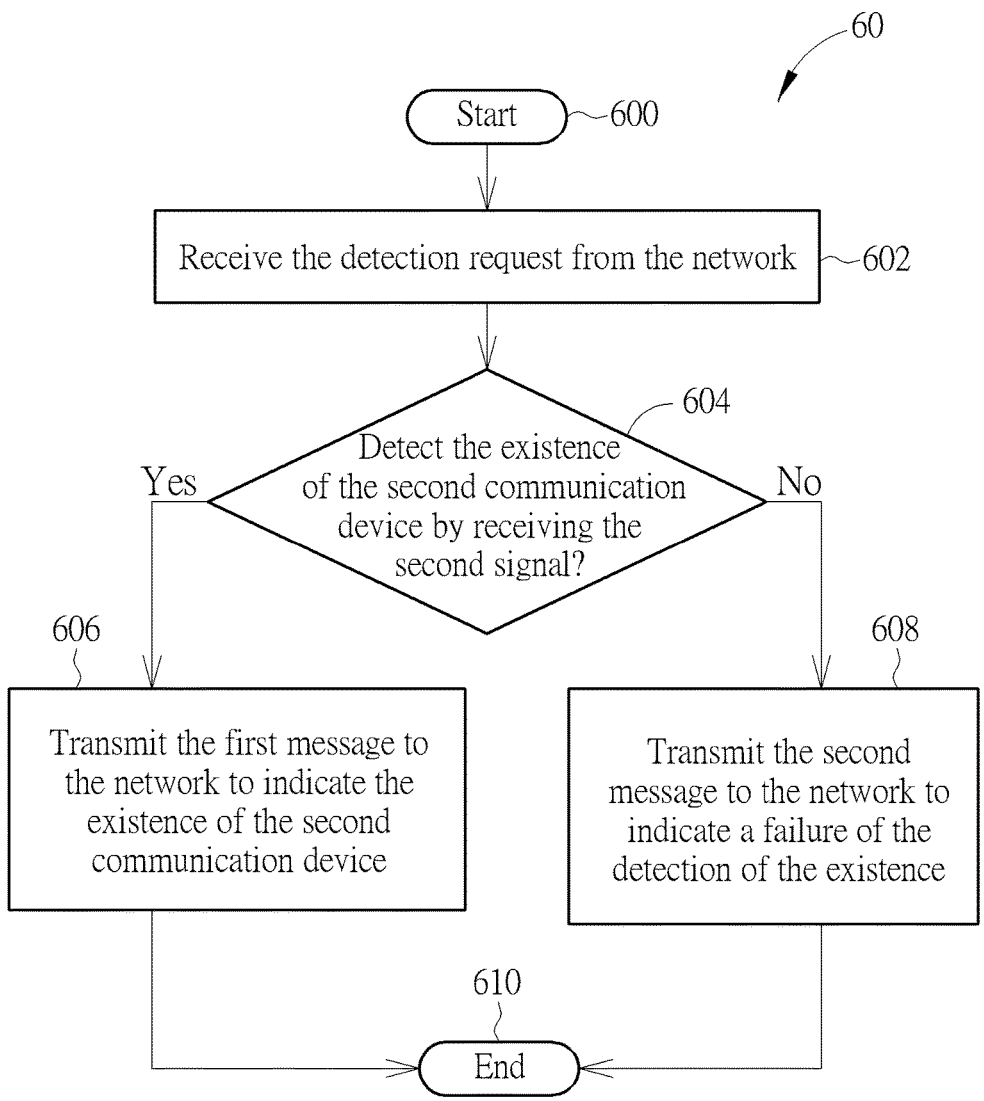
FIG. 6 is a flowchart of a process according to an example of the present invention.

In addition, the first communication device receives a detection request from the network and performs the detection of the second communication device. If the first communication device detects the existence of the second communication device, the first communication device transmits a first message to indicate the existence of the second communication device. Otherwise, the first communication device transmits a second message to the network to indicate a failure of the detection of the existence. The operations of the first communication device for detecting the second communication device for performing the direct communications can be summarized to a process 60 as shown in FIG. 6. The process 60 can be compiled into the program code 314 and includes the following steps:

Step 600: Start.

Step 602: Receive the detection request from the network.

Step 604: Detect the existence of the second communication device by receiving the second signal? If the second communication device exists, execute Step 606; if not, execute step 608.

Step 606: Transmit the first message to the network to indicate the existence of the second communication device and go to Step 610.

Step 608: Transmit the second message to the network to indicate a failure of the detection of the existence.

Step 610: End.

In brief, the first communication device detects the existence of the second communication device and indicates the existence of the second communication device to the network. After the network receives the first message, the network configures the first communication device to enter the direct communication mode. Therefore the network can make sure the direct communications can work normally. The first communication device may transmit the first signal after receiving the detection request.

Figure 7:
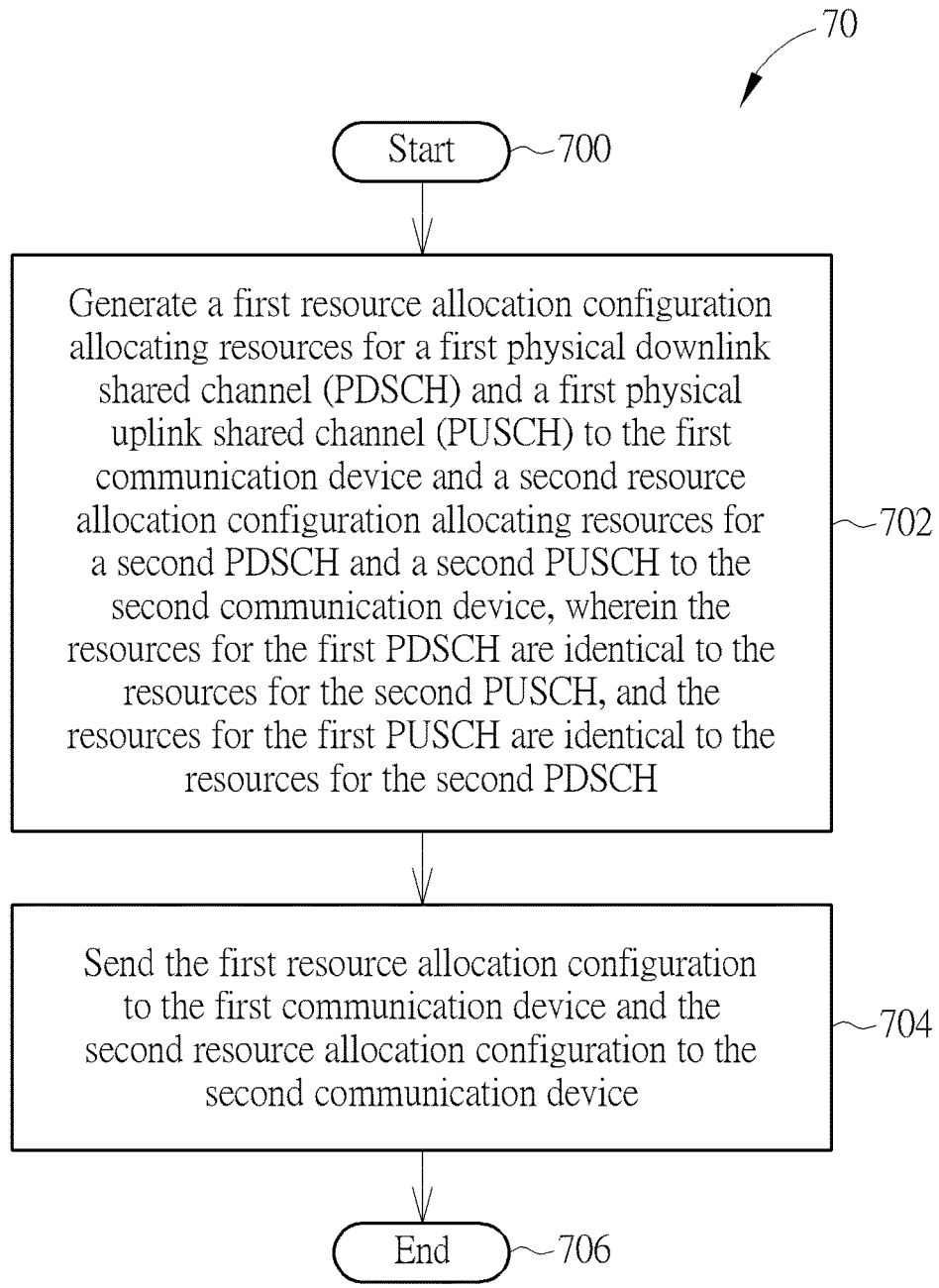
FIG. 7 is a flowchart of a process according to an example of the present invention.

Please refer to FIG. 7, which is a flowchart of a process 70 according to an example of the present invention. The process 70 is utilized in the wireless communication system 20 shown in FIG. 2, for assigning resources to perform direct communications in the network. The process 70 can be utilized in the network and may be compiled into the program code 314. The process 70 includes the following steps:

Step 700: Start.

Step 702: Generate a first resource allocation configuration allocating resources for a first physical downlink shared channel (PDSCH) and a first physical uplink shared channel (PUSCH) to the first communication device and a second resource allocation configuration allocating resources for a second PDSCH and a second PUSCH to the second communication device, wherein the resources for the first PDSCH are identical to the resources for the second PUSCH, and the resources for the first PUSCH are identical to the resources for the second PDSCH.

Step 704: Send the first resource allocation configuration to the first communication device and the second resource allocation configuration to the second communication device.

Step 706: End.

According to the process 70, the network respectively allocates the resources for the first PDSCH and the first PUSCH to the first communication device and the resources for the second PDSCH and the second PUSCH to the second communication device. The resources contain at least one of subcarrier assignment, resource block assignment, at least one of a new data indicator, redundancy version, a modulation and coding scheme (MCS), and hopping resource allocation. The first communication device transmits a first transport block on the first PUSCH in a first subframe to the second communication device and the second communication device directly receives the first transport block on the second PDSCH in the first subframe. In other words, the first PUSCH in the first subframe for the first communication device is the second PDSCH in the first subframe for the second communication device. Similarly, the second communication device transmits a second transport block on the second PUSCH in a second subframe to the first communication device and the first communication device directly receives the second transport block on the first PDSCH in the second subframe. In other words, the second PUSCH in the second subframe for the second communication device is the first PDSCH in the second subframe for the first communication device. Therefore, the first and second communication devices can communicate with each other directly according to the first and second resource allocation configurations received from the network. The network may further respectively generate a third resource allocation configuration allocating resources for a first physical uplink control channel (PUCCH) to the first communication device and a fourth resource allocation configuration allocating resources for a second PUCCH to the second communication device, to send hybrid automatic repeat request (HARQ) acknowledgement responses, and send the third resource allocation configuration to the first communication device and the fourth resource allocation configuration to the second communication device. The third resource allocation configuration can be in the first resource allocation configuration or sent separately. The fourth resource allocation configuration can be in the second resource allocation configuration or sent separately.

Note that, the process 70 is an example of the present invention. Those skilled in the art should readily make combinations, modifications and/or alterations on the above-mentioned description and examples. For example, the first resource allocation configuration may be sent via a first PDCCH, a first MAC control element or a first RRC message to the first communication device from the network, and the second resource allocation configuration may be sent via a second PDCCH, a second MAC control element or a second RRC message to the second communication device from the network. For the case of the transmission of the first and the second resource allocation configurations on the first and second PDCCHs respectively, the first resource allocation configuration can be a second downlink assignment generated by the network and sent by the network on the second PDCCH to the second communication device to receive a first transport block on the second PDSCH, and the second resource allocation configuration can be an first uplink grant generated by the network and sent by the network on the first PDCCH to the first communication device to transmit the first transport block on the first PUSCH. The first PDCCH may have same search space as the second PDCCH or partial overlap of search space with the second PDCCH. The second downlink assignment maybe the first uplink grant so the first communication device and the second communication device receive a same downlink control information (DCI). If the second downlink assignment is the first uplink grant, the second PDSCH and second downlink assignment are not in a same subframe. Similarly, a first downlink assignment is sent by the network on the first PDCCH to the first communication device to receive a second transport block on the first PDSCH and a second uplink grant is allocated by the network on the second PDCCH to the second communication device to transmit the second transport block on the second PUSCH. Moreover, the first or second uplink grant is a dynamic uplink grant or a configured uplink grant, i.e. Semi-Persistent Scheduling, and the first or second downlink assignment is allocated via a dynamic downlink assignment or configured downlink assignment, i.e. Semi-Persistent Scheduling. In addition, the first PDSCH, the first PUSCH, the second PDSCH and the second PUSCH may be allocated in a multicast broadcast single frequency network (MBSFN) subframe of the network, so that the direct communications would not affect the normal communications between the first and second communications and the network.

In another aspect, the carriers used for the first PDSCH and the second PUSCH are the same as a first carrier, and the carriers used for the first PUSCH and the second PDSCH are the same as a second carrier. For a frequency division duplexing (FDD) system, the first carrier is different from the second carrier. For a time division duplexing (TDD) system, the first carrier is the same as the second carrier. The network may transmit a first subframe configuration to the first communication device and a second subframe configuration to the second communication device to configure which subframe used for the first and second PUSCHs and which subframe used for the first and second PDSCHs. When a subframe is configured for the first PUSCH for the first communication device, the subframe is configured for the second PDSCH for the second communication device. Similarly, when a subframe is configured for the first PDSCH for the first communication device, the subframe is configured for the second PUSCH for the second communication device. The first subframe configuration information and the second subframe configuration information are carried in the first and second PDCCHs, the first and second MAC control elements or the first and second RRC messages.

Furthermore, when the carrier of the first PDCCH is the same as that of the first PDSCH (i.e. the first carrier), the first communication device should receive a subframe of the first PDCCH and a subframe of the first PDSCH in different time. When the carrier of the first PDCCH is different from that of the first PDSCH, the first communication device can receive a subframe of the first PDCCH and a subframe of the first PDSCH at the same time. The operations for the second communication device are similar.

In another aspect, a timing advance should be performed to allow the transmissions between the first and second communication devices. For example, a timing advance value of an uplink transmission of the first communication device is updated by the second communication device or the network via sending a timing advance command.

Figure 8:
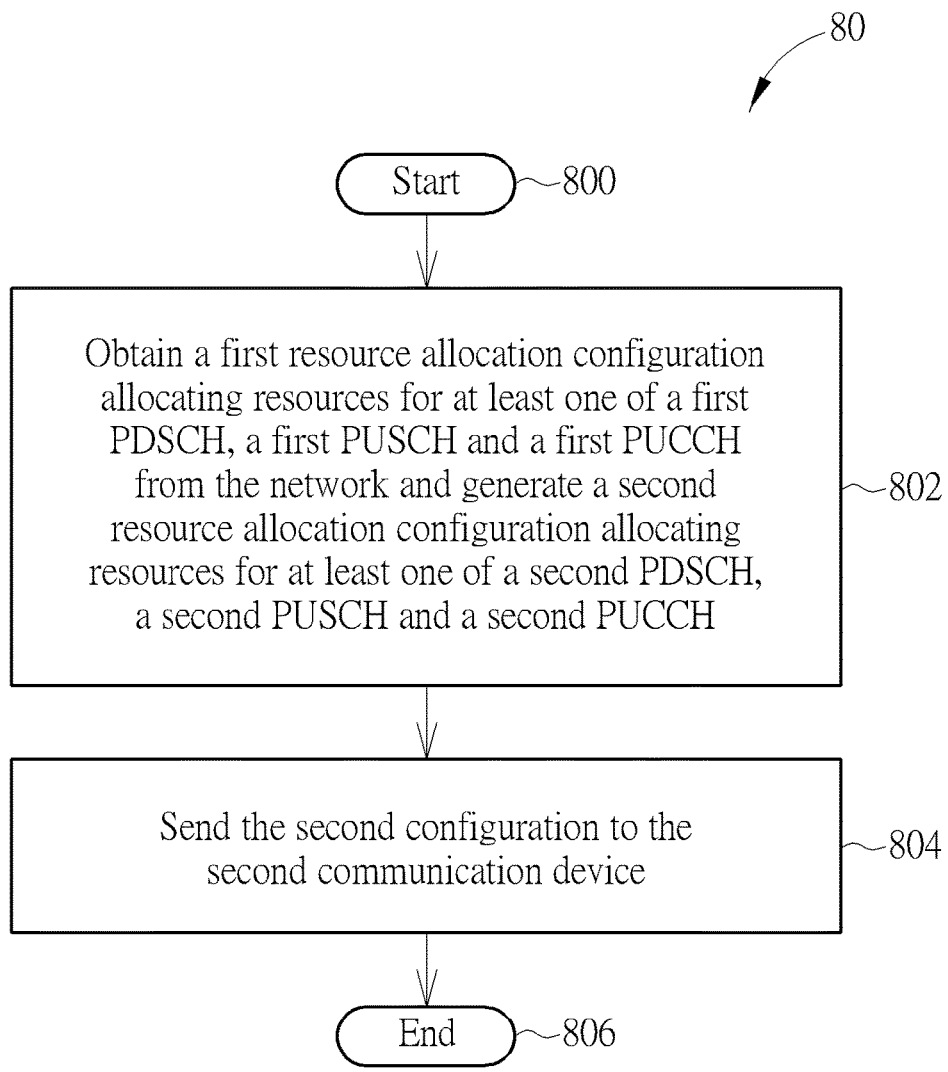
FIG. 8 is a flowchart of a process according to an example of the present invention.

Please refer to FIG. 8, which is a flowchart of a process 80 according to an example of the present invention. The process 80 is utilized in the wireless communication system 20 shown in FIG. 2, for assigning resources to perform direct communications in one of the communication devices. The process 80 can be utilized in the network and may be compiled into the program code 314. The process 80 includes the following steps:

Step 800: Start.

Step 802: Obtain a first resource allocation configuration allocating resources for at least one of a first PDSCH, a first PUSCH and a first PUCCH from the network and generate a second resource allocation configuration allocating resources for at least one of a second PDSCH, a second PUSCH and a second PUCCH.

Step 804: Send the second configuration to the second communication device.

Step 806: End.

The concept of the process 80 is similar to that of the process 70. The main difference between the processes 70 and 80 is that the second resource allocation configuration allocating the resources for at least one of the second PDSCH, the second PUSCH and the second PUCCH is generated by the first communication instead of the network. The resources contain at least one of subcarrier assignment, resource block assignment, a new data indicator, redundancy version, a MCS, and hopping resource allocation. There are several ways to generate the second resource allocation configuration. The first communication device can generate the second resource allocation configuration according to the first resource allocation configuration. For example, the first communication device generates the second resource allocation configuration set exactly same as the first resource allocation configuration or part of resources in the second resource allocation configuration set same as part of resources in the first resource allocation configuration, e.g. the second resource allocation configuration has same resource block assignment as the first resource allocation configuration. The first communication device can generate the second resource allocation configuration according to other information. For example, the first communication device generates the second resource allocation configuration according to signal strength or signal quality measured by the first communication device or signal strength, signal quality or channel state information reported from the second communication device, in any form, e.g. Reference Signal Received Power (RSRP), Reference Signal Received Quality (RSRQ), channel quality indicator (CQI), and precoding matrix indicator (PMI).

Note that, the process 80 is an example of the present invention. Those skilled in the art should readily make combinations, modifications and/or alterations on the above-mentioned description and examples. For example, the first resource allocation configuration may be sent via the first PDCCH, the first MAC control element or the first RRC message to the first communication device from the network, and the second resource allocation configuration may be sent via the second PDCCH, the second MAC control element or the second RRC message to the second communication device from the first communication device. For the case of the transmission of the first and the second resource allocation configurations on the first and second PDCCHs respectively, the second resource allocation configuration is the second downlink assignment generated by the first communication device and sent by the first communication device on the second PDCCH to the second communication device to receive the first transport block on the second PDSCH, and the first resource allocation configuration is the first uplink grant generated by the network and sent by the network on the first PDCCH to the first communication device to transmit the first transport block on the first PUSCH. The second PDCCH and the first PUSCH may or may not be in a subframe. If the second PDCCH and the first PUSCH are in the subframe, the second PDCCH is located within the start of the subframe (e.g. up to the first one, two or three OFDM symbols) and the first PUSCH is located within the rest OFDM symbols in the subframe. The first communication device may further transmit the first PUCCH (e.g. containing an HARQ acknowledgement) in the subframe as well as the second PDCCH and the first PUSCH.

Similarly the second communication device performs behaviors described above to transmit a transport block to the first communication device and the first communication device receives the transport block from the second communication device. Alternatively, the first communication device receives a transport block as described below. The first downlink assignment can be generated by the network and sent by the network on the first PDCCH to the first communication device to receive the second transport block on the first PDSCH, and the second uplink grant can be generated by the first communication device and sent by the first communication device on the second PDCCH to the second communication device to transmit the second transport block on the second PUSCH.

In brief, the first communication device generates and sends the second resource allocation configuration allocating the resources for at least one of the second PDSCH, the second PUSCH and the PUCCH to the second communication device. Therefore, the first and second communication devices can communicate with each other directly.

In the present invention, the network configures communication devices to enter the direct communication mode and assigns the resources to the communication devices for performing the direct communications. Since the communication devices use the resources to communicate with each other directly, data is not sent via the network and overhead of the transmission and the reception can further be reduced.

To sum up, the present invention provides a method and apparatus for performing direct communications, to reduce overhead of the reception and transmission between the network and the communication devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of assigning resources to perform direct communications in a first communication device of a wireless communication system, the method comprising:

the first communication device receiving a first resource allocation configuration transmitted by a second communication device wherein the first resource allocation allocates resources for the first communication device to receive a transport block transmitted by the second communication device in a subframe; and the first communication device receiving the transport block according to the first resource allocation configuration;

wherein the first resource allocation configuration is generated by the second communication device and the transport block is transmitted by the second communication device according to a second resource allocation configuration which is obtained from a network and allocates resources for the second communication device to transmit the transport block in the subframe to the first communication device;

wherein the first resource allocation configuration is an assignment generated by the second communication device and sent by the second communication device on a second physical control channel to the first communication device for receiving the transport block in the subframe and the second resource allocation configuration is a grant generated by the network and sent by the network on a first physical control channel to the second communication device to transmit the transport block in the subframe.

2. The method of claim 1, wherein the second resource allocation configuration is sent via a first physical control channel, a first medium access control (MAC) control element or a first radio resource control (RRC) message between the first communication device and the network and the first resource allocation configuration is sent via a second physical control channel, a second MAC control element or a second RRC message between the first communication device and the second communication device.

3. The method of claim 1, wherein the first resource allocation configuration is generated according to the second resource allocation configuration.

4. A method of assigning resources to perform direct communications in a network of a wireless communication system for a network, the method comprising:

transmitting a first resource allocation configuration allocating resources for a first communication device to transmit a transport block in a subframe to a second communication device;

wherein the first communication device generates a second resource allocation configuration allocating resources for the second communication device to receive the transport block in the subframe according to the first resource allocation configuration; and transmits the second resource allocation configuration to the second communication device;

wherein the second resource allocation configuration is an assignment generated by the first communication device and sent by the first communication device on a second physical control channel to the second communication device for receiving the transport block in the subframe and the first resource allocation configuration is a grant generated by the network and sent by the network on a first physical control channel to the first communication device to transmit the transport block in the subframe.

5. The method of claim 4, wherein the first resource allocation configuration is sent via a first physical control channel, a first medium access control (MAC) control element or a first radio resource control (RRC) message between the first communication device and the network and the second resource allocation configuration is sent via a second physical control channel, a second MAC control element or a second RRC message between the first communication device and the second communication device.

6. A communication apparatus for assigning resources to perform direct communications in a first communication device of a wireless communication system, comprising:

a processing means; and a storage unit, coupled to the processing means, for storing a program code, wherein the program code instructs the processing means to execute the following steps:

receiving a first resource allocation configuration transmitted by a second communication device wherein the first resource allocation allocates resources for the first communication device to receive a transport block transmitted by the second communication device in a subframe; and receiving the transport block according to the first resource allocation configuration;

wherein the first resource allocation configuration is generated by the second communication device and the transport block is transmitted by the second communication device according to a second resource allocation configuration which is obtained from a network and allocates resources for the second communication device to transmit the transport block in the subframe to the first communication device;

wherein the first resource allocation configuration is an assignment generated by the second communication device and sent by the second communication device on a second physical control channel to the first communication device for receiving the transport block in the subframe and the second resource allocation configuration is a grant generated by the network and sent by the network on a first physical control channel to the second communication device to transmit the transport block in the subframe.

7. The communication apparatus of claim 6, wherein the second resource allocation configuration is sent via a first physical control channel, a first medium access control (MAC) control element or a first radio resource control (RRC) message between the first communication device and the network and the first resource allocation configuration is sent via a second physical control channel, a second MAC control element or a second RRC message between the first communication device and the second communication device.

8. The communication apparatus of claim 6, wherein the first resource allocation configuration is generated according to the second resource allocation configuration.

9. A communication apparatus for assigning resources to perform direct communications in a network of a wireless communication system for a network, comprising:

a processing means; and a storage unit, coupled to the processing means, for storing a program code, wherein the program code instructs the processing means to execute the following steps:

transmitting a first resource allocation configuration allocating resources for a first communication device to transmit a transport block in a subframe to a second communication device;

wherein the first communication device generates a second resource allocation configuration allocating resources for the second communication device to receive the transport block in the subframe according to the first resource allocation configuration; and transmits the second resource allocation configuration to the second communication device;

wherein the second resource allocation configuration is an assignment generated by the first communication device and sent by the first communication device on a second physical control channel to the second communication device for receiving the transport block in the subframe and the first resource allocation configuration is a grant generated by the network and sent by the network on a first physical control channel to the first communication device to transmit the transport block in the subframe.

10. The communication apparatus of claim 9, wherein the first resource allocation configuration is sent via a first physical control channel, a first medium access control (MAC) control element or a first radio resource control (RRC) message between the first communication device and the network and the second resource allocation configuration is sent via a second physical control channel, a second MAC control element or a second RRC message between the first communication device and the second communication device.

* * * * *